March 9, 1926.
K. L. HERRMANN
TIRE CARRIER SUPPORT
Filed Sept. 20, 1924
1,575,685
2 Sheets-Sheet 1
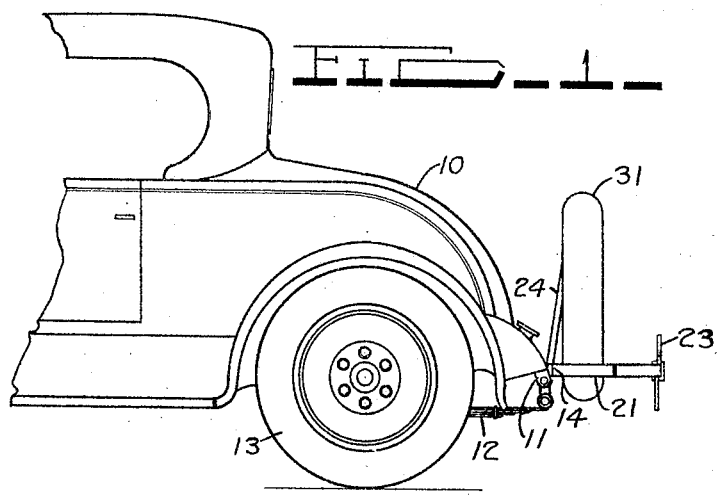
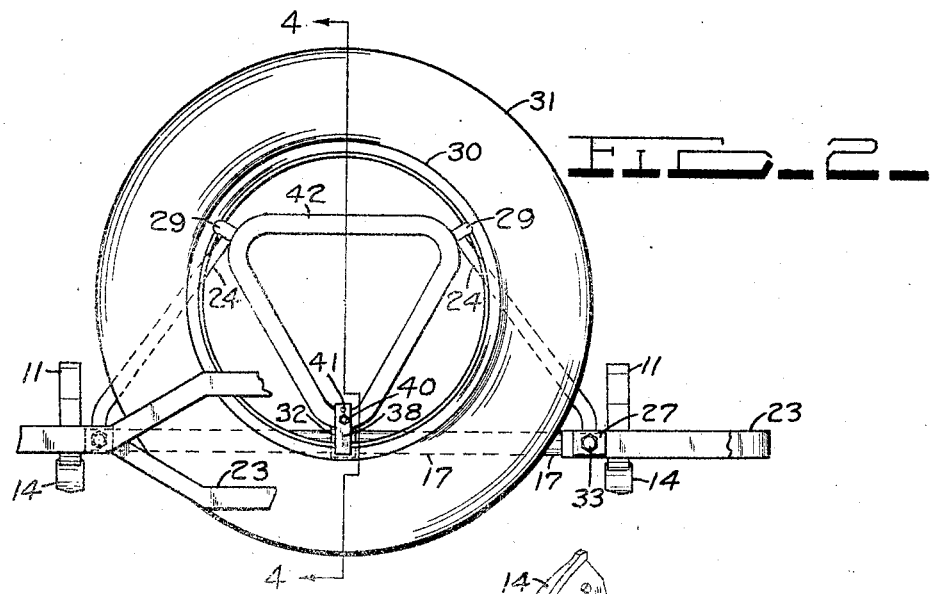
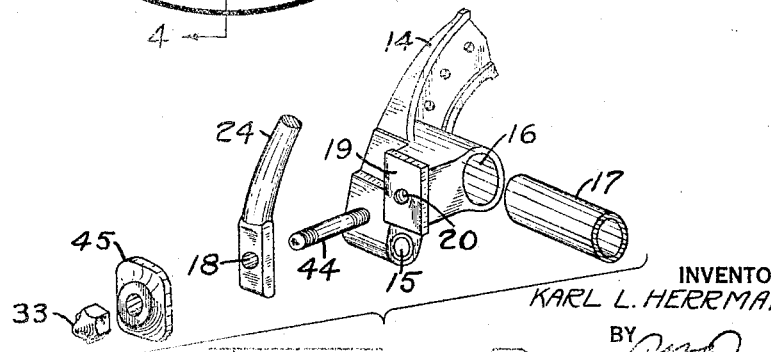
INVENTOR
KARL L. HERRMANN
BY
ATTORNEY March 9, 1926.
K. L. HERRMANN
TIRE CARRIER SUPPORT
Filed Sept. 20, 1924
1,575,685
2 Sheets-Sheet 2
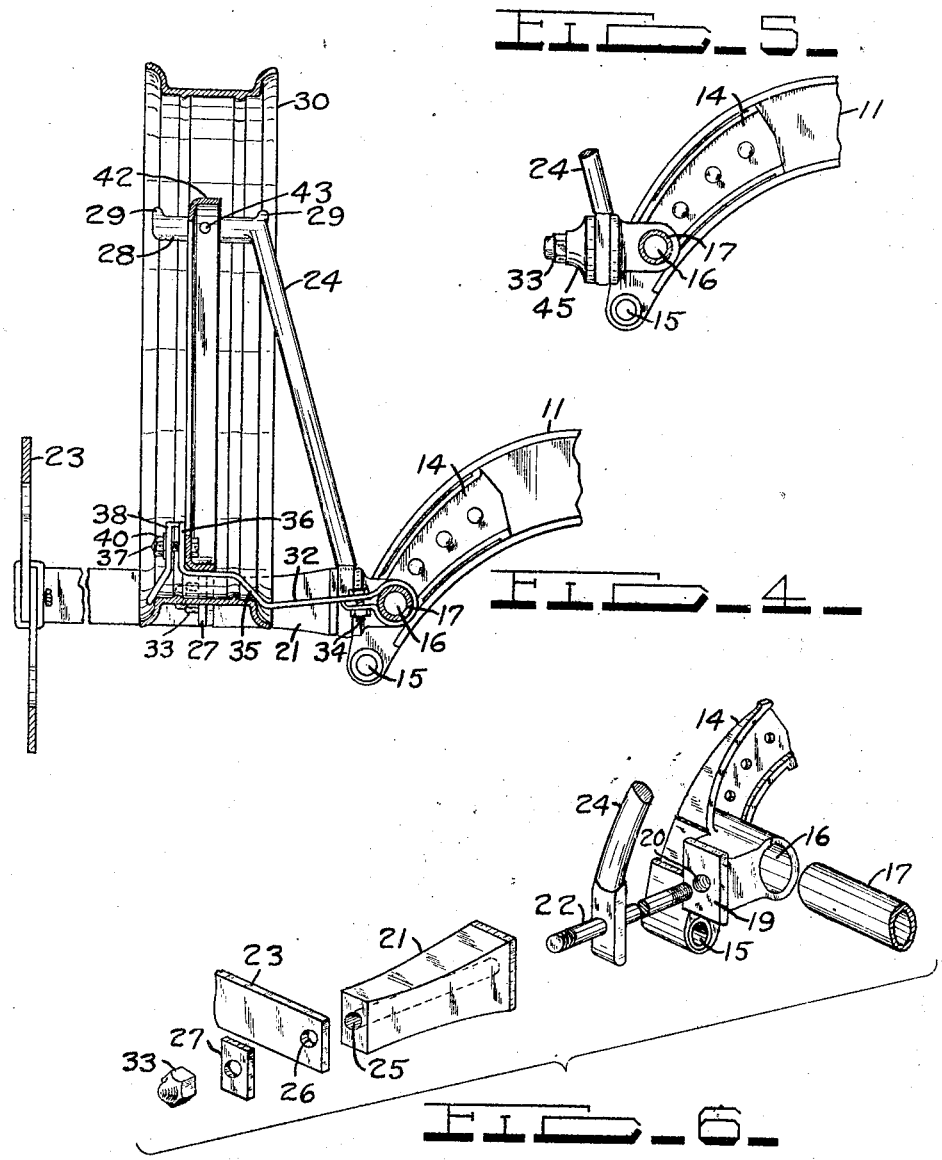
INVENTOR
KARL L. HERRMANN
BY
P. N. Pomeroy
ATTORNEY Patented Mar. 9, 1926.

1,575,685

UNITED STATES PATENT OFFICE.

KARL L. HERRMANN, OF DETROIT, MICHIGAN, ASSIGNOR TO THE STUDEBAKER CORPORATION, OF SOUTH BEND, INDIANA, A CORPORATION OF NEW JERSEY.

TIRE-CARRIER SUPPORT.

Application filed September 20, 1924. Serial No. 738,910.

*To all whom it may concern:*

Be it known that I, KARL L. HERRMANN, a citizen of the United States of America, and resident of Detroit, in the county of Wayne and State of Michigan, have invented certain new and useful Improvements in Tire-Carrier Supports, of which the following is a specification.

This invention relates to motor vehicles and particularly to tire carrying and bumper supporting means therefor and is an improvement of the construction shown and described in the application of John I. Muncy for improvements in tire carriers, filed September 6, 1924, Serial Number 736,301.

An object of the present invention is to provide an improved method of supporting a tire carrier on a motor vehicle.

Another object is to provide an improved method of supporting a bumper on a motor vehicle.

Another object is to provide an improved construction whereby single means is employed on each side of the vehicle for supporting either or both a tire carrier and bumper.

A further object is to provide in combination with a vehicle having frame side members, a frame end comprising a unitary member provided with a spring shackle bolt opening, a frame cross member receiving portion, and a rearwardly projecting vertically disposed flat face provided with a central threaded opening for receiving a rearwardly projecting stud, the spare tire carrier of the vehicle being provided with two side arms whose lower ends are provided with openings to receive the studs, and the rear bumper being also provided with openings to receive the studs, suitable spacing members being provided if desired, so that either the tire carrier or bumper, or both, may be supported by means of the single stud on each side of the vehicle.

The above being among the objects of the present invention, the same consists of certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several views, Figure 1 is a side view of the rear portion of a motor vehicle incorporating a construction embodying the present invention.

Figure 2 is a view of the tire carrier and adjacent parts shown in Figure 1 taken from the rear of the vehicle looking forward.

Figure 3 is a perspective view of certain of the parts in position ready for assembly when the tire carrier only is used and the bumper omitted.

Figure 4 is an enlarged sectional view taken on the line 4—4 of Figure 2.

Figure 5 is a side view of the parts shown in Figure 3 in assembled position and secured to the vehicle frame side member.

Figure 6 is a perspective view of certain of the parts in position ready for assembly when both the tire carrier and bumper are used.

In the drawings is illustrated a motor vehicle having a body 10, frame side members 11, springs 12 and wheels 13. Fitting within and secured to the rear end of the frame side members 11 in a conventional manner is a cast or forged member 14 which serves several following purposes: It has a downwardly projecting portion provided with an opening 15 which receives a conventional spring shackle bolt; an opening 16 disposed horizontally crosswise of the vehicle which receives and in which is secured the tubular frame cross member 17; and a rearwardly projecting vertically extending flat face portion 19 provided with a centrally disposed threaded opening 20.

Referring now to Figures 1, 2, 4 and 6, in which figures a bumper is incorporated, a long stud 22 is threaded into the opening 20 and projects rearwardly therefrom for supporting a bumper 23, of any conventional design, and tire carrier arms 24. The lower ends of the tire carrier arms are flattened and are provided with a central opening 18 which receives the stud 22 and allows the arm 24 to be slipped thereover and up against the flat face 19 of the member 14. A bumper bracket or spacer member 21 provided with an axial opening 25 which receives the stud 22 is thereafter slipped over the stud 22 and against the flattened end of the arm 24. This is followed by the rear bar of the bumper 23 which is provided with an opening 26 for receiving the stud 22 and then by the washer member 27 and nut 33 which draws all of the parts on the stud 22 securely up against each other and clamps them into a unitary structure.

The tire carrier itself, of which the arms 24 form a part, is in itself no part of this invention, but it is deemed advisable to briefly describe the same so that the relation of the tire carrier to the invention will be more readily understood. The arms 24 extend upwardly and inwardly and are provided at their upper ends with rearwardly extending portions 28 formed with upwardly and outwardly extending lips 29 for engaging the sides of the tire rim 30 which is received thereagainst. These two arms 24 take substantially all of the vertical load of the rim 30 and its tire 31. A third arm 32 provided to steady the carrier and prevent it from vibrating, is secured to the center of the tubular cross member 17 by being looped therearound and drawn into close contact with it by the bolt 34. The arm 32 is bent to form a downwardly and forwardly projecting stop face 35 adapted to contact against the lower edge of the rim 30 and form a stop therefor, and the rear portion is bent vertically upwards as at 36 and is provided with a rearwardly extending stud 37 which receives the clamping bar 38 and nut 40 for locking the rim 30 in position on the carrier. Suitable means such as the opening 41 in the clamping bar 38 matching a like opening in the upwardly bent portion 36 of the arm 32 through which a padlock may be passed, is preferably provided for preventing unauthorized displacement of the clamping bar 38 in order to remove the rim 30 and tire 31.

The ends of the three arms 24 and 32 are connected to the vertices of a continuous rigid triangular angle-iron frame 42 by rivets 43 or the like which effectively prevents relative displacement of one of the arms in respect to the other two.

In Figures 3 and 5 a modified construction is shown in which no bumper 23 or bracket 21 is included. In these figures the long studs 22 are replaced by a shorter stud 44 over which the lower ends of the arms 24 are slipped and followed by a washer member 45 and nut 33. This construction is desirable to use when cars are sold without bumpers, as those desiring bumpers may replace the stud 43 by the long stud 22 and add the brackets 21 and bumper 23, thus giving them ready means of securely and properly mounting their bumpers in contrast with the ill-fitting, cumbersome and laboriously applied devices usually associated with the application of bumpers to motor vehicles not especially equipped for their reception.

It is not thought necessary to illustrate a like case where, as on many so-called "sport model" cars, the spare tire and rim are carried at the side of the body, in which case the bumper only may be supported by the stud 22 in an obvious manner, and it is also obvious that the same general construction may be used for supporting the bumper at the front of the vehicle.

It will be apparent from the drawings and foregoing description that the invention involved herein affords a simple, neat and effective construction which particularly lends itself to economies in production as only the slightest changes are involved in adapting it for suporting either a bumper, a tire carrier, or both.

Formal changes may be made in the specific embodiment of the invention described without departing from the spirit and substance of the broad invention, the scope of which is commensurate with the appended claims.

What I claim is:—

1. In combination with a motor vehicle provided with rear frame ends having a flat face, and a tire carrier having supporting arms, of means comprising a projecting stud on each of said frame ends to receive the ends of said tire carrier arms, and means to secure said arms against the flat faces on said frame ends.

2. In combination with a motor vehicle provided with frame ends and a bumper, said frame ends having attaching faces to receive said bumper, of means comprising a projecting stud on each attaching face to receive said bumper, and means on said studs to secure said bumper against said attaching faces on said frame ends.

3. In combination with a motor vehicle provided with rear frame ends, of means for supporting a bumper and a tire carrier having two main supporting arms, said means comprising a stud projecting from the rear face of each of said frame ends and received in openings in said tire carrier arms and said bumper, and means on said studs to draw said arms and said bumper toward said faces.

4. In combination with a motor vehicle provided with rear frame ends having studs projecting therefrom, a tire carrier having arms provided with openings for receiving said studs, a bumper provided with openings for receiving said studs, and means for securing either the tire carrier or the bumper, or both, on said studs.

5. In combination with a motor vehicle provided with frame ends, each end having a vertically disposed transversely extending flat face, a bumper provided with supporting portions having openings therein, and screw means passing through said openings and into said frame ends to clamp said supporting portions relative to said flat face portions.

6. In combination with a motor vehicle having frame ends, each end provided with a vertically disposed transversely extending flat face, a stud projecting from each of said flat faces, spacer members on said studs, a bumper having openings receiving said studs, and means for drawing all of said parts into close relationship.

7. In combination with a motor vehicle provided with frame ends, each end having a vertically disposed transversely extending flat face, a stud projecting from each of said flat faces, tire carrier arms having flat end portions for engagement with said flat faces provided with openings for receiving said studs, and means for drawing said flat end portions of said tire carrier arms into close contact with said flat faces on said frame ends.

8. In combination with a motor vehicle having frame side members, a unitary member secured to the rear end of each of said frame side members provided with a transverse opening for receiving a spring shackle bolt, a second transverse opening for receiving a frame cross member, and a rearwardly disposed flat vertical face provided with a rearwardly projecting stud, a tire carrier having two arms received on said studs, bumper brackets and a bumper on said studs, and means for drawing said bumper, bumper brackets and said tire carrier arms towards said flat faces for clamping them in operative position.

9. In combination with a motor vehicle having frame side members, a frame end member secured to each of said frame side members, said frame end members comprising a unitary part provided with an opening for receiving a spring shackle bolt, a second opening in which is received and secured a frame cross member, and a vertically disposed rearwardly facing face portion, and means comprising a stud threaded perpendicularly into said face whereby a tire carrier and a bumper may be supported on said vehicle either singly or together.

Signed by me at Detroit, Michigan, U. S. A., this 12th day of September, 1924.

KARL L. HERRMANN.